United States Patent [19]

Nonaka et al.

[11] Patent Number: 5,264,892
[45] Date of Patent: Nov. 23, 1993

[54] CAMERA DISTANCE MEASURING APPARATUS

[75] Inventors: Osamu Nonaka, Sagamihara; Akira Inoue; Kazuhiro Yamuchi, both of Hachioji, all of Japan

[73] Assignee: Olympus Optical Co., Ltd., Tokyo, Japan

[21] Appl. No.: 720,908

[22] Filed: Jun. 25, 1991

[30] Foreign Application Priority Data

Jul. 4, 1990 [JP] Japan ............................ 2-178398

[51] Int. Cl.⁵ .............................................. G03B 3/00
[52] U.S. Cl. .................................................. 354/403
[58] Field of Search ............................. 354/403, 402

[56] References Cited

U.S. PATENT DOCUMENTS

| | | | |
|---|---|---|---|
| 4,764,786 | 8/1988 | Tamura et al. | 354/403 |
| 4,855,585 | 8/1989 | Nonaka | 250/201 |
| 4,908,646 | 3/1990 | Sato et al. | 354/403 X |
| 5,006,700 | 4/1991 | Kosaka et al. | 354/403 X |
| 5,051,766 | 9/1991 | Nonaka et al. | 354/403 X |

FOREIGN PATENT DOCUMENTS

| | | |
|---|---|---|
| 58-9013 | 1/1983 | Japan. |
| 58-76715 | 5/1983 | Japan. |
| 1-114707 | 5/1989 | Japan. |

*Primary Examiner*—Michael L. Gellner
*Assistant Examiner*—Jae N. Noh
*Attorney, Agent, or Firm*—Louis Weinstein

[57] ABSTRACT

This distance measuring apparatus comprises a first light projecting device for projecting a distance measuring light to an object to be photographed in the central part of a picture; second and third light projecting devices for projecting distance measuring light to objects in the peripheral parts of the picture; a first distance measuring operating device for receiving the reflected light from the object in the central part of the picture and outputting the first distance information in response to the object distance; second and third distance measuring operating devices for receiving reflected light from objects in the peripheral parts of the picture and outputting second and third distance informations in response to the object distances; and a photographing distance determining device for determining a photographing distance based on the above mentioned distance information. The photographing distance determining device has a first judging part for judging the first distance information to be a photographing distance in case the first distance information is within a predetermined distance range; a second judging part for judging either of the first and second distance informations to be a photographing distance in case the first distance information is a distance nearer than the predetermined distance range and the second distance information is also a distance nearer than the predetermined distance; and a third judging part for judging the first distance information to be a photographing distance in case the first distance information is in a distance farther than the predetermined distance.

19 Claims, 8 Drawing Sheets

CAMERA DISTANCE MEASURING APPARATUS

BACKGROUND OF THE INVENTION

1. Field of the Invention

This invention relates to a distance measuring apparatus of a camera and more particularly to a distance measuring apparatus used for a camera or the like and an active type distance measuring apparatus wherein a spot-like beam as of infrared rays is projected to an object to be photographed and the reflected light from the object is received and used to automatically measure the distance to the object.

2. Related Background Art

As well known, the active type autofocus (abbreviated as AF hereinafter) apparatus is so generally prevalent that this kind of AF apparatus is mounted on most lens shutter cameras.

Figure 12:
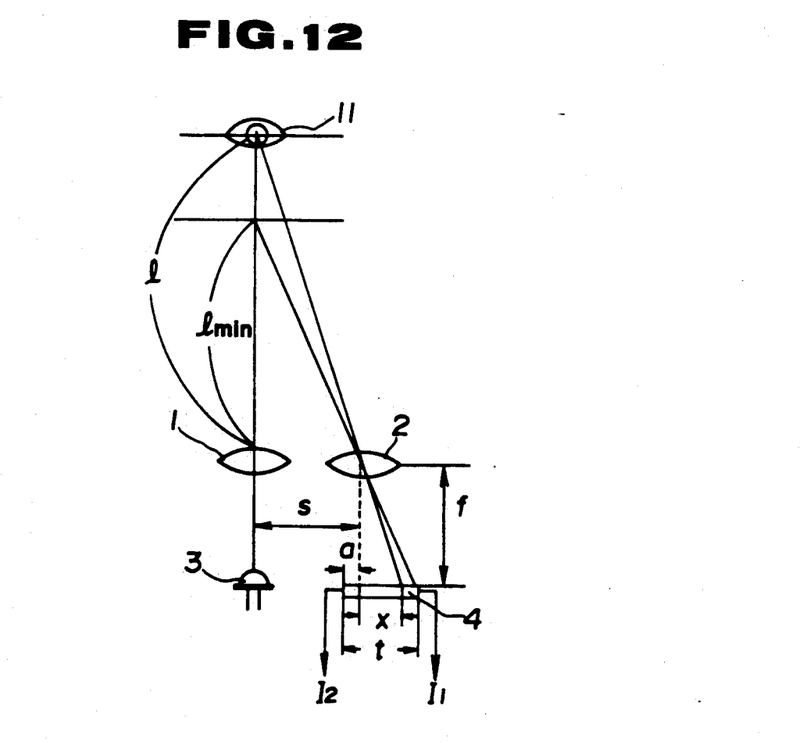
FIG. 12 is an essential part formation view of a well known active type one-point distance measuring apparatus.

The formation of the above mentioned active type AF apparatus based on the generally known triangular distance measuring method shall be explained in the following with reference to FIG. 12. A light emitted from an infrared ray emitting diode (abbreviated as an IRED hereinafter) 3 is condensed and radiated by a light projecting lens 1 toward an object to be photographed and the reflected light is made by a light receiving lens 2 to form an image on a well known position sensitive device (abbreviated as a PSD hereinafter) 4 made of a one-dimensional semiconductor position detecting device. As a result, this PSD 4 will provide an output to be separated into light current signals $I_1$ and $I_2$ which will be fed to a later described IC for AF.

Here, by the principle of the triangular distance measuring method, the entrance position x of the reflected light on the PSD will be a function of the distance l to the object as in the following formula:

$$l = s \cdot f / x \quad (1)$$

wherein s represents a distance (base line length) between the main points of the light projecting lens 1 and light receiving lens 2, f represents a focal distance of the light receiving lens 2 and the PSD 4 is arranged in this position. This PSD 4 outputs the two light current signals $I_1$ and $I_2$ which are functions of the entrance position x of the distance measuring signal light. Now, when a line parallel with a line connecting the light emitting center of the IRED 3 and the main point of the light projecting lens 1 is extended from the main point of the light receiving lens 2, if the point of crossing the PSD 4 is taken at a point of a length a from the end on the IRED side of the PSD 4, the total signal light current is represented by $I_{F0}$ and the total length of the PSD 4 is represented by t, $$I_1 = \{(a+x)/t\} I_{F0} \quad (2)$$

$$I_2 = \{t-(a+x)/t\} I_{F0} \quad (3)$$

will be made and therefore, from the above mentioned formulae (2) and (3), 1/l can be determined by $$I_1/(I_1 + I_2) = (a + x)/t \quad (4)$$
$$= (1/t)\{a + (s \cdot f/l)\}$$

That is to say, in the above mentioned formula (4), as the total length t of the PSD 4, the length a from the end on the IRED side of the PSD 4, the base line length s and the focal distance f of the light receiving lens 2 are respectively constants, if the light current ratio $I_1/(I_1+I_2)$ is determined, the reciprocal 1/l of the object distance will be able to be determined.

The above is the summary of a known one-point distance measuring apparatus.

Figure 5A:
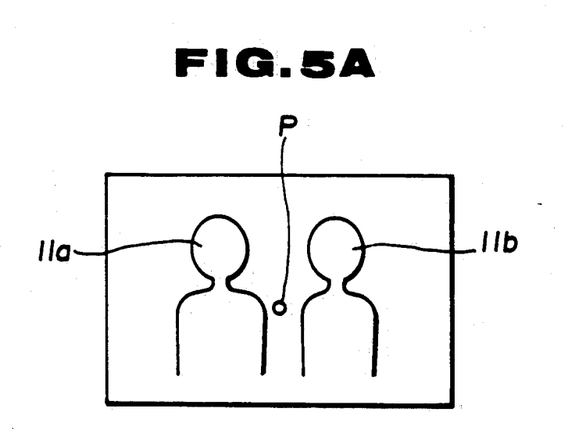
FIGS. 5A and 5B are explanatory views of the central blank phenomenon.

However, in most of the conventional AF cameras of this kind, the AF operation is made by one IRED and therefore only the distance to any one point to which the projected light from the same IRED is radiated has been able to be measured. That is to say, the distance has been able to be measured only at one point or mostly in the central part within the picture. Therefore, if the main objects to be photographed deviate from this point as in the case that the main objects 11a and 11b are not present in the position upon which the distance measuring beam P is projected in the picture to be photographed, that is, as shown in FIG. 5A, a so-called "central blank" state will be made and the AF apparatus will focus another object or the background, that is, the infinite distance and will take a photograph out of focus of the main objects.

Figure 5B:
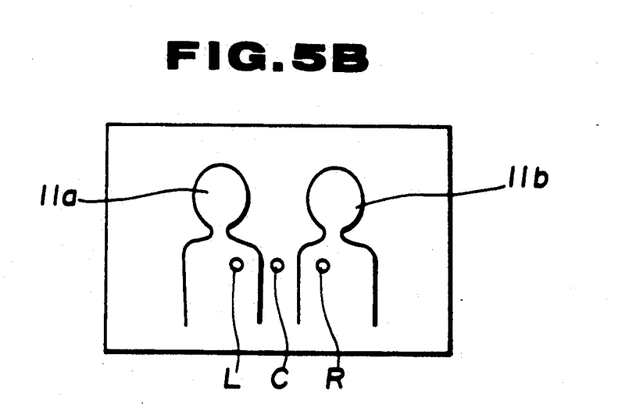

Therefore, in order to eliminate this problem, a multi-point distance measuring apparatus wherein, as shown in FIG. 5B, distance measuring spot lights are radiated to a plurality of points, for example, three points L, C and R in the picture to be photographed and the object distances are determined from these reflected lights to prevent the "central blank" is suggested by Japanese Patent Applications Laid Open Nos. 9013/1983 and 76715/1983. In this kind of multipoint distance measuring apparatus, the possibility of the object being at the nearest distance point among a plurality of measured distance point informations is so high that the photographing lens is driven and controlled to the nearest distance.

However, in the distance measuring apparatus wherein a distance measuring spot light is radiated to an object to be photographed, if all the spot light having a limited expanse is radiated to the object, the distance will be accurately measured but, if the spot light hits the object at the edge, only a part of the spot light will be reflected and the distance will be mis-measured. This mis-measurement of the distance shall be explained more particularly in the following with reference to FIGS. 9A to 11B.

Figure 9A:
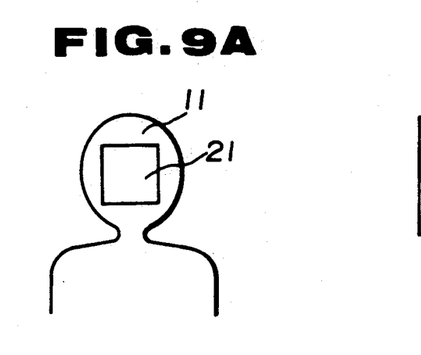
FIGS. 9A, 9B, 10A, 10B, 11A and 11B are diagrams showing respective corresponding position relationship between the projected light spot on the object and the reflected light spot entering the PSD.
Figure 9B:
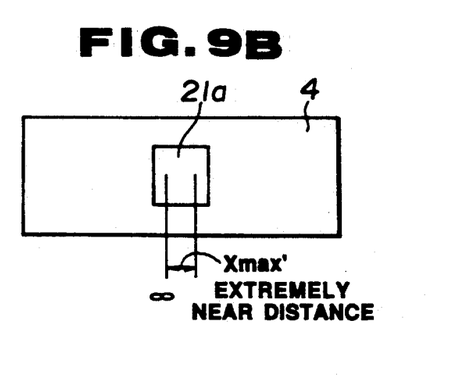

FIG. 9A shows a spot light 21 on an object 11 to be photographed. FIG. 9B shows a reflected light 21a on a PSD 4. As shown in this FIG. 9A, in case the splot light perfectly impinges upon the object 11, the reflected light 21a will ideally impinge upon the PSD 4 which will output a right light current signal from its gravity position and the gravity position will move from the position corresponding to the infinite distance on the PSD 4 to the position corresponding to the extremely near distance in response to the object distance.

Figure 10A:
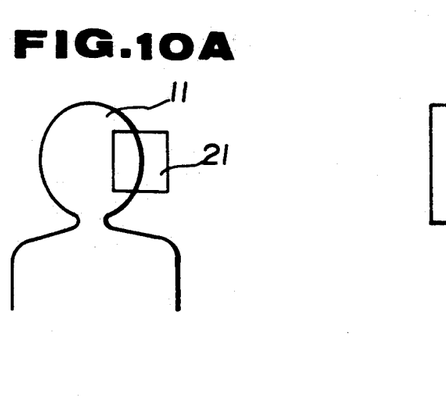
Figure 10B:
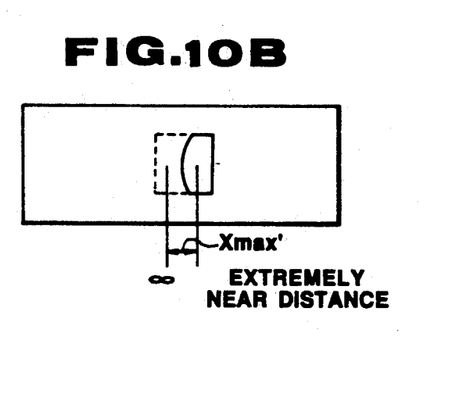
Figure 11A:
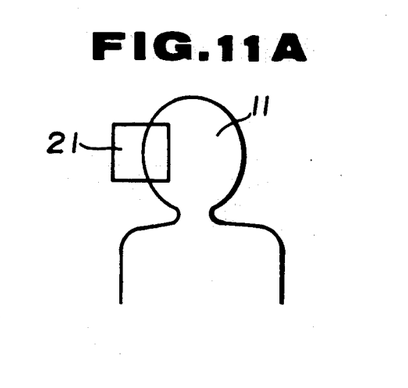
Figure 11B:
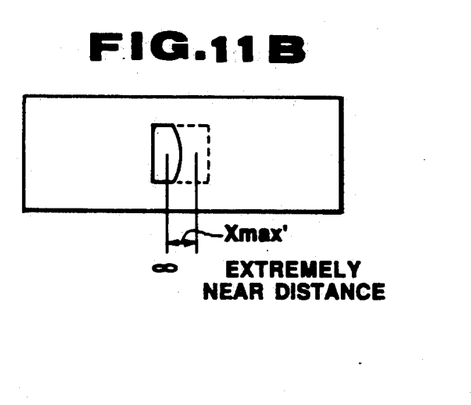

However, as shown in FIGS. 10A and 11A, in case the object 11 is a little deviated in the lateral direction from the position of the spot light 21 shown in FIG. 9A and the spot light is not perfectly reflected, a light current signal will be output from the gravity position of only the reflected light and therefore, even for the object 11 located at the same distance as in FIG. 9A, in the case of FIG. 10A, the gravity position will move to the near distance side on the PSD as shown in FIG. 10B and a light current signal deviated to the near distance side more than in FIGS. 9A and 9B will be output. On the contrary, in the case of FIG. 11A, as shown in FIG. 11B, a light current signal deviated to the far distance side will be output.

In case one spot light is received with one PSD, the amount of this mis-measurement of the distance may be comparatively small but, in the case of a multipoint distance measuring apparatus receiving a plurality of spot lights with one PSD, the moved amount on the PSD from the infinite distance to the extremely near distance of one spot light will be so small that the mis-measurement of the distance by the above mentioned "spot light deviation" will become large. Further, the mis-measurement of the distance by this "spot light deviation" is likely to be produced on each spot light. This likelihood will be higher in the multipoint distance measuring apparatus by the number of the many points than in the one-point distance measuring apparatus, the distance measurement will result in outputting a light current signal deviated to the near distance side and a photograph that is out of focus will be made.

SUMMARY OF THE INVENTION

An object of the present invention is to provide a camera distance measuring apparatus wherein the above mentioned conventional defects are eliminated, the "central blank" can be prevented and the mis-measurement of the distance by the "spot light deviation" can be prevented.

According to the present invention, even for an object not positioned in the central part of the photographed picture, the "central blank" can be prevented, the mis-measurement of the distance by the spot light deviation can be prevented and the object distance can be accurately measured.

BRIEF DESCRIPTION OF THE DRAWINGS

FIGS. 3A to 3D are views for for explaining the fundamental idea of the distance measuring apparatus of the present invention. More specifically:

FIG. 4 is simplified.

DETAILED DESCRIPTION OF PREFERRED EMBODIMENTS

First of all, prior to explaining an embodiment of the present invention, the fundamental idea of a camera distance measuring apparatus of the present invention shall be explained with reference to FIGS. 3A to 3B.

Figure 3A:
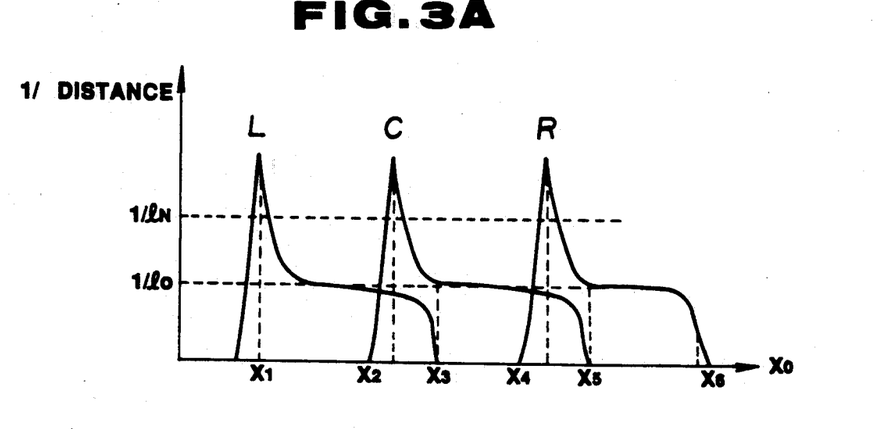
FIG. 3A is a graphic diagram showing the results of chart distance measurements.
Figure 3B:
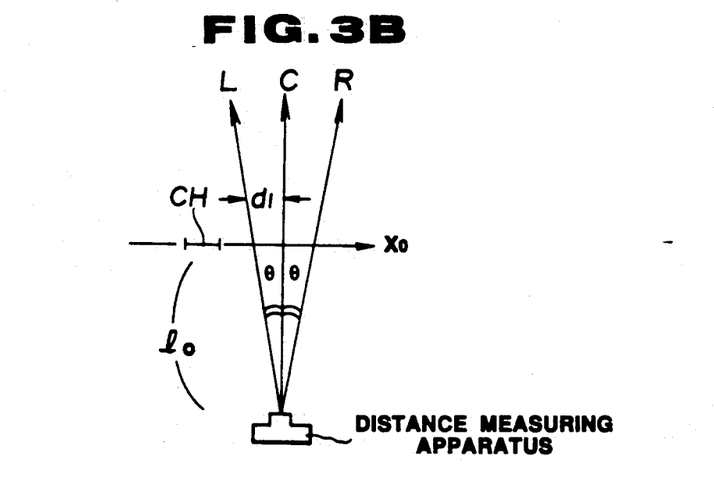
FIG. 3B is a diagram showing an experiment method of the chart distance measurements.

FIG. 3A shows the results of distance measurements when distances were measured with a distance measuring apparatus according to the present invention by using as an object to be photographed a chart CH of a size corresponding to a human face of a diameter of about 20 mm. and FIG. 3B shows an experimental method of the distance measurement. In this case, when the object distance $l_0$ is around 2 m. and the distances of three points of L, C and R are measured while shifting the above mentioned chart CH in the $x_0$ direction, as shown in FIG. 3A, the points $x_1$, $x_2$ and $x_4$ at which the error by the spot light deviation appears to be large on the near distance side and the points $x_3$, $x_5$ and $x_6$ at which the distance measurement error appears on the far distance side will become apparent.

In the present invention, the distance measurement errors produced near $x_2$ and $x_4$ among them are to be improved by using adjacent distance measuring data and, in case data corresponding to the extremely near distance are output at $x_2$ and $x_4$, they will be neglected.

Figure 3C:
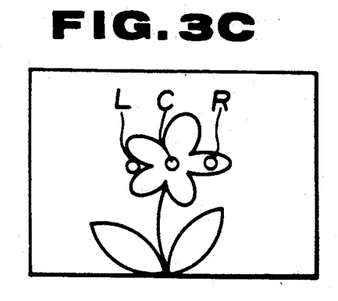
FIGS. 3C and 3D are explanatory views of projected light spots radiated to the object.

Here, the case that the extremely near distance is actually measured and the case that the distance measuring output corresponding to the extremely near distance is output by the spot light deviation can be discriminated from each other by whether the two adjacent points are both of data deviated to the extremely near distance from a distance $l_N$ (near distance comparing value) or not. In such macro-photographing as photographing an object located at a distance, for example, of less than 1 m., as the interval $d_1$ of the spot light of the IRED is comparatively shorter than $l_0 \tan \theta$, as shown in FIG. 3C, the two adjacent points (C and R) are considered to output data deviated to the extremely near distance from the near distance comparing value $l_N$ in the same manner.

Figure 3D:
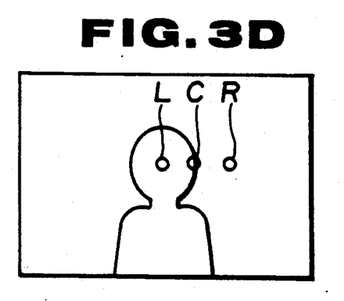

On the other hand, when, as shown in FIG. 3D, the projected light spot C outputs a result corresponding to the extremely near distance by the spot light deviation, the other points will be considered to output other results than of the extremely near distance at a considerably high probability. Such discrimination and lens payout distance determination are to be made by the later described CPU.

The above is the fundamental idea of the distance measuring apparatus of the present invention.

Figure 1:
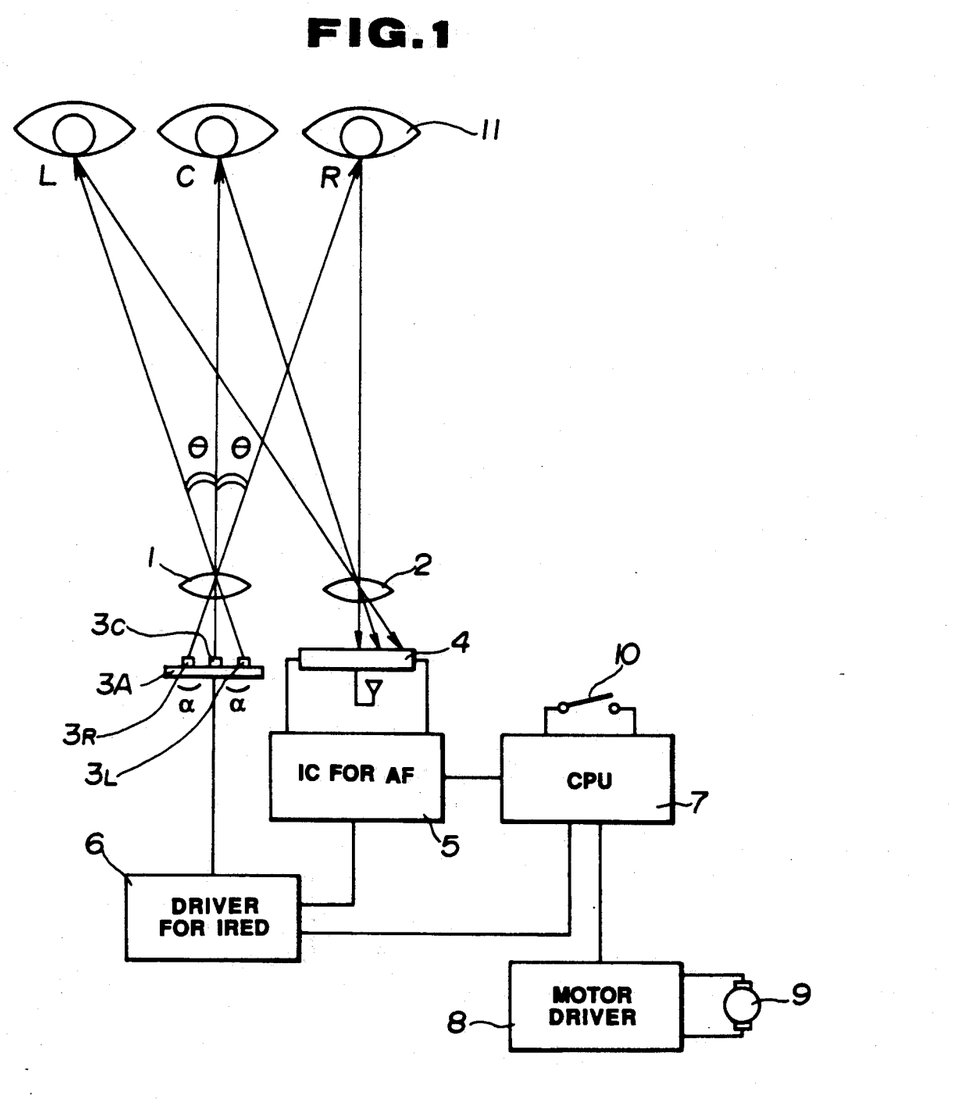
FIG. 1 is a formation block diagram of a camera distance measuring appartus showing an embodiment of the present invention.

FIG. 1 is a formation diagram of a camera distance measuring apparatus showing an embodiment of the present invention as applied to an AF apparatus of a camera. In this camera, a light projecting means and a light receiving means are arranged in the lengthwise direction of the camera so that the position of the reflected light from an object to be photographed of a light projected by the above mentioned light projecting means may be detected. That is to say, this camera is formed of a light emitting part comprising a light projecting lens 1, an IRED part 3A having a plurality, for example, of three IRED's $3_R$, $3_C$ and $3_L$ mounted on a light emitting device substrate and a driver for the IRED's, a light receiving part comprising a light receiving lens 2, a PSD 4 and an analogue operating IC (mentioned as an AFIC hereinafter) 5 and an operation controlling circuit (mentioned as a CPU hereinafter) 7 formed of a one-touch microcomputer or the like determining the photographing distance by correcting and operating the output result of the AFIC 5 and controlling a photographing lens driving motor 9 through a motor driver 8. By the way, among the above mentioned three IRED's $3_R$, $3_C$ and $3_L$, the IRED $3_C$ is arranged in the center on the light emitting device substrate and forms a first light projecting means, the IRED's $3_R$ and $3_L$ are arranged respectively on opposite sides of it, the IRED $3_L$ forms a second light projecting means and the IRED $3_R$ forms a third light projecting means. The reference numeral 10 represents a releasing switch and the reference numeral 11 represents an object to be photographed.

In the thus formed above mentioned embodiment, when the releasing switch 10 is closed, the CPU 7 will deliver a distance measurement starting signal to the AFIC 5. At this time, the IRED light emitting driver 6 will be enabled so that the central IRED $3_C$ as the first light projecting means may emit a light also by the CPU 7. This AFIC is detailed in Japanese Patent Application Laid Open No. 114707/1989 suggested by the present applicant.

Figure 2:
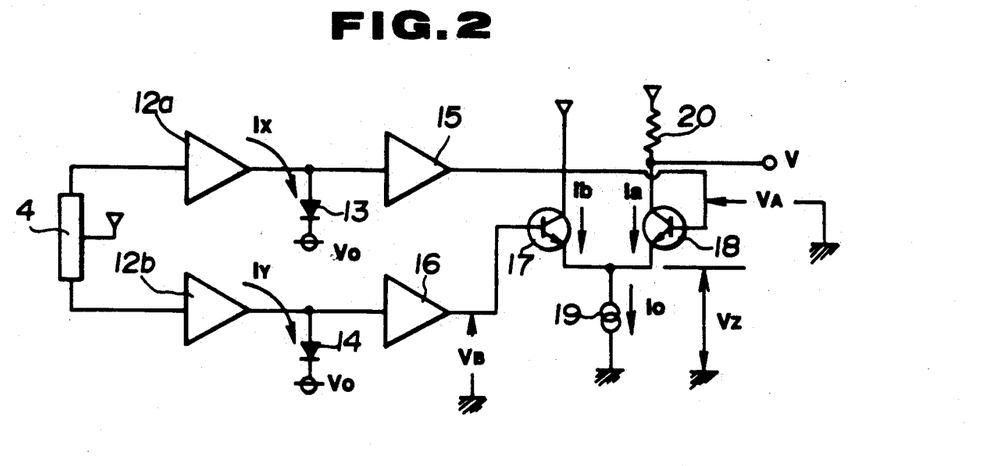
FIG. 2 is an electric circuit diagram of an essential part of the IC for AF in the above mentioned FIG. 1.

An example of an electric circuit of this AFIC 5 shall be explained in the following with reference to FIG. 2. The outputs of the above mentioned PSD 4 have the unnecessary light current outputs in the DC (direct current) state from the PSD 4 removed by pre-amplifiers 12a and 12b and only the IRED signal light current in the pulse state entering the PSD 4 is amplified. The outputs Ix and Iy respectively of the pre-amplifiers 12a and 12b are applied as current signals respectively into compressing diodes 13 and 14 and are converted to compressed voltage signals. Respectively through buffer amplifiers 15 and 16, the output compressed voltage signals $V_A$ and $V_B$ are input into an extension operating circuit consisting of NPN type transistors 17 and 18, a constant current source 19 and a current-voltage converting resistance 20.

Here, if a thermal voltage given by kT/q (wherein k represents Boltzmann's constant, T represents a temperature and q represents an electric charge) is represented by $V_T$ and a reverse direction saturated current of the diodes 13 and 14 and transistors 17 and 18 is represented by Is, by using voltages $V_0$ and $V_Z$, relative formulae $$V_A = V_T l_n(Ia/Is) + V_Z \quad (5)$$
$$= V_0 + V_T l_n(Ix/Is)$$

and $$V_B = V_T l_n(Ib/Is) + V_Z \quad (6)$$
$$= V_0 + V_T l_n(Iy/Is)$$

will be made. From the above mentioned formulae (5) and (6), a relative formula $$Ib = (Ia/Ix) \cdot Iy \quad (7)$$

will be derived but, from $$Ia + Ib = I_0, \quad (8)$$

$$Ia = \{Ix/(Ix + Iy)\} I_0, \quad (9)$$

as Ix and Iy are proportional respectively to $I_1$ and $I_2$, from the above mentioned formulae (4) and (9), $$Ia = (I_0/t)\{a + (s \cdot f)/l\} \quad (10)$$

will be made and $$Ia \propto 1/l \text{ and}$$

$$Ia \propto a$$

will be made.

This collector current Ia is output from the AFIC 5 by a current-voltage converting resistance 20 and is taken into the CPU 7 as a digital value by an A/D converting circuit built-in in the CPU 7 and a reciprocal 1/l is operated by $$1/l = \{t \cdot (Ia/I_0) - a\} \cdot 1/s \cdot f \quad (11)$$

However, in this operation of 1/l, as shown in FIG. 1, in the case of measuring the right and left distances, when the focal distances of the light projecting lens 1 and light receiving lens 2 are equal, it will be necessary to change a in the formula (11) respectively to $a - \alpha$ and $a + \alpha$.

By the thus obtained distance information l, the CPU 7 determines the pay-out amount for focusing of the focusing lens. An algorithm for this purpose shall be explained according to flow charts in and after FIG. 4.

First of all, the first distance information lc is measured by the central projected light spot C and it is judged whether this measured result lc is nearer than the near distance comparing value $l_N$ or not (in steps S1 and S2). In this case, this near distance comparing value $L_N$ shall be 1 m. on the nearer distance side than near 2 m. of the normal focal distance. If this result is nearer than $l_N$, it will be considered in two ways that this is a mis-measurement of the distance by a spot light deviation and that the object to be photographed is truly near. Therefore, as shown in the flow diagram in the left row in the chart of FIG. 4 in the second judging part consisting of steps S7 to S11, with reference to the second and third distance informations obtained by the second and third light projecting means, either is judged.

Figure 4:
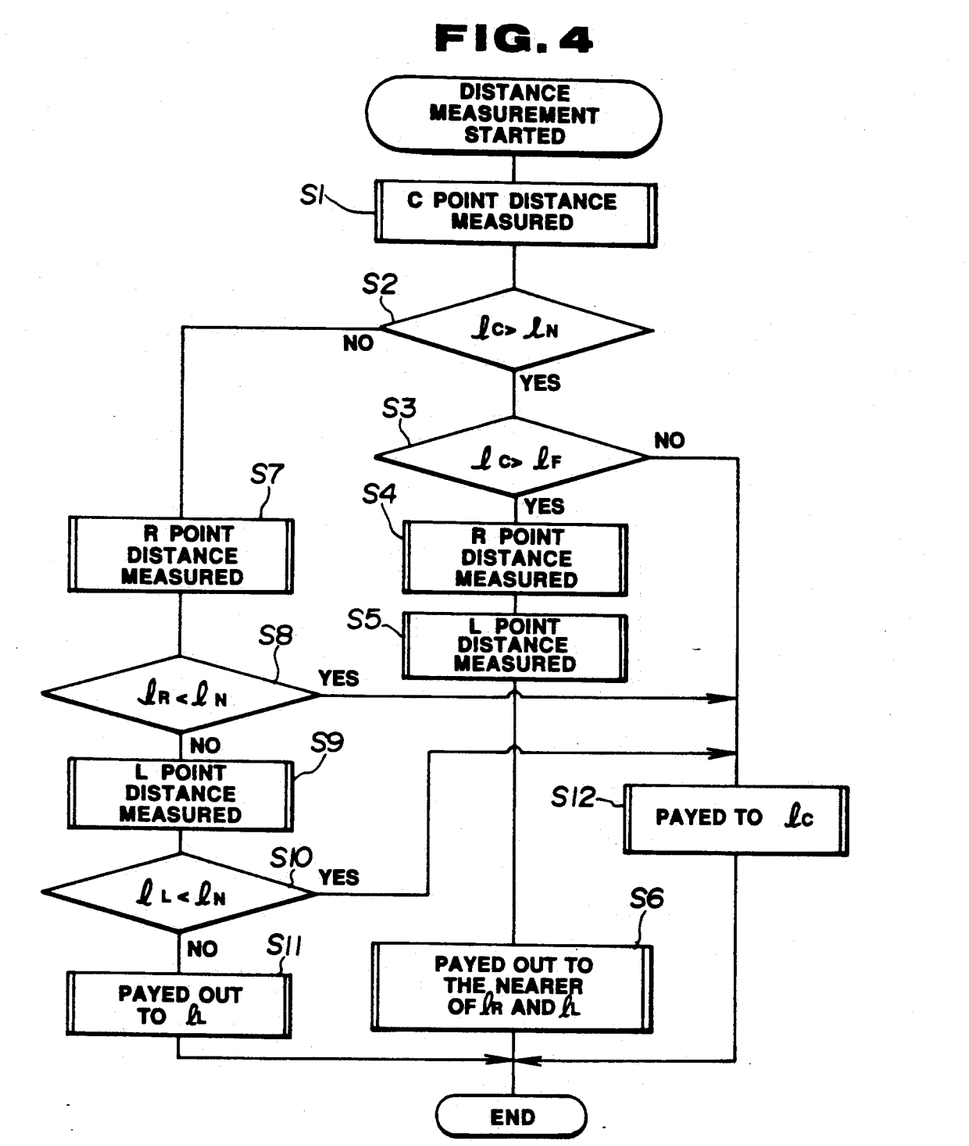
FIG. 4 is a flow chart showing the operation of a distance measuring apparatus of the embodiment in the above mentioned FIG. 1.

That is to say, first of all, a distance measuring light is projected to the R point on the right side from the third light projecting means of the IRED $3_R$, the third distance information $l_R$ is obtained by measuring the distance (step S7) and it is also judged the same as in the above whether this distance measuring result $l_R$ is nearer than the near distance comparing value $l_N$ (step S8). If this result is a near distance, the central distance measuring result will be considered to be right and the lens will be payed out according to the distance measuring result lc by the central projected light spot (step S12). Even if the third distance information $l_R$ by the projected light spot R on the right side is farther than the near distance comparing value $l_N$, the distance by the projected light spot L on the left side will be measured by the second light projecting means of the IRED $3_L$ to obtain the second distance information $l_L$ (step S9). If this distance measuring result $l_L$ shows a value nearer than the near distance comparing value $l_N$ (step S10), the distance measuring result by the central projected light spot C will be considered to be right and the focusing will be controlled according to the central distance measuring result (step S12).

As already described in the above mentioned FIG. 1, such lens drive is controlled by the motor 9 through the motor driver 8 by the CPU 7 and the IRED's $3_R$ and $3_L$ are controlled to be switched respectively to the projected light spots R (right) and L (left) by the IRED driver 6 by the CPU 7.

Thus, when the central and right projected light spots or the central and left projected light spots respectively output data nearer than the near distance comparing value $l_N$ in the same manner, it will be judged that, in this algorithm, the spot light is not deviated and focusing is made by heavily considering the first distance information $l_C$ by the central projected light spot. However, when only the first distance information $l_C$ by the central projected light spot C outputs data nearer than $l_N$, the central projected light spot C will be considered to deflect the spot light and mis-measure the distance. Therefore, the object is judged to be just at the $x_2$ point in FIG. 3A and is focused according to the distance measuring result $l_L$ of the projected light spot L determined in the above mentioned step S9 (step S11). Next, the case of outputting the result that the first distance measuring information $l_C$ by the central projected light spot C is farther than the far distance comparing value $l_F$ shall be considered.

In this case, in the conventional autofocus in which the distance can be measured only at one point, the "central blank" phenomenon which has been often a problem is considered to have occurred. This is a phenomenon in which, as in FIG. 5A, for such objects 11a and 11b as two persons arranged side by side, a distance measuring light P passes through between the two persons and is focused in the background. In such case, in the present invention, the distances of the distance measuring points L and R are measured as shown in FIG. 5B and the light is focused on the output of the nearer distance measuring result. This is a general method practiced in the conventional multipoint distance measuring apparatus. In this case, in the third judging part consisting of the steps S4 to S6 shown in the flow diagram in the central lower part in the chart, the R point distance of the same contents as of the above mentioned step S7 (step S4) and the L point distance of the same contents as of the above mentioned step S9 (step S5) are respectively measured and then, on the basis of the nearer distance measuring data of the second and third distance informations $l_L$ and $L_R$, the lens is payed out (step S6).

Finally, when the first distance measuring information $l_C$ by the central projected light spot C is located between the near distance comparing value $l_N$ and the far distance comparing value $l_F$, this will be judged to be by neither light deviation nor central blank and, by the first judging part consisting of the step S12, the first distance information $l_C$ will be focused. Thus, in case the object present in the center exists near the normal focus, the distances of the R and L points will not be measured, the first distance information $l_C$ will be focused and the time lag will be able to be suppressed to be short.

Figure 6:
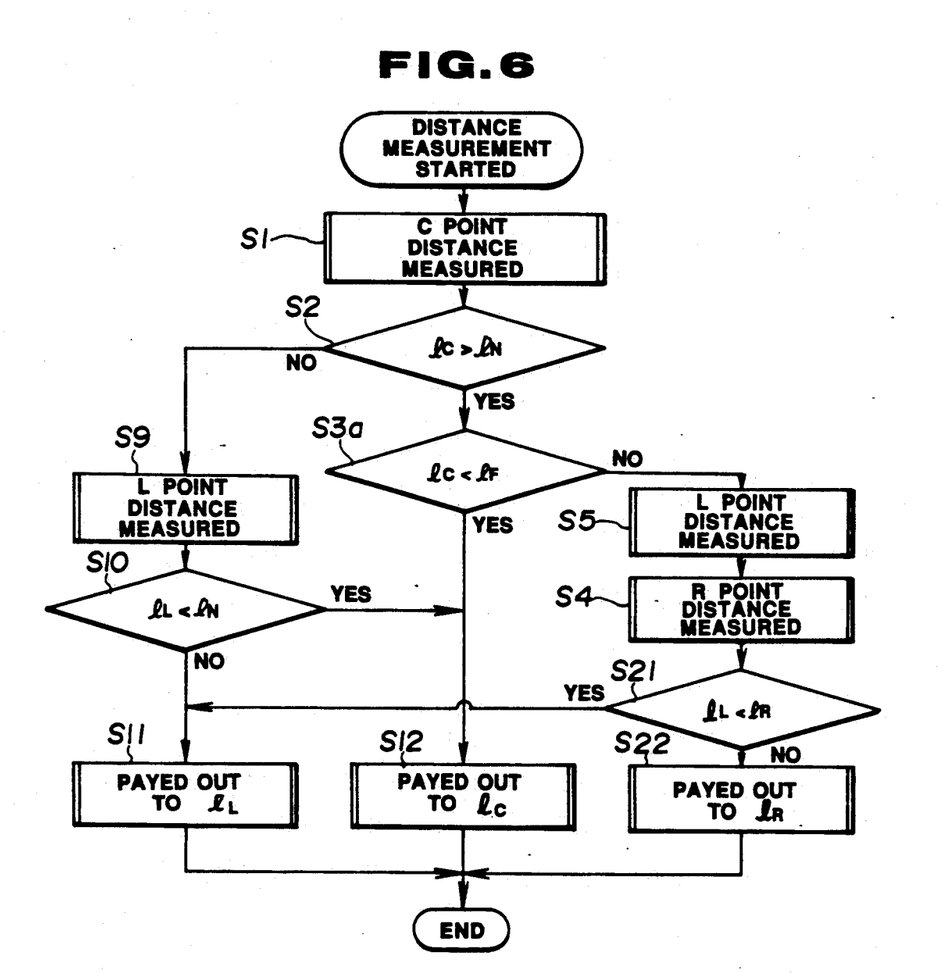
FIG. 6 is a flow chart in which the second judging part in the flow chart in the above mentioned

FIG. 6 is a flow chart showing a modification of the operation shown in the above mentioned FIG. 4. The great differences of this flow chart from the above mentioned FIG. 4 are that, in the judgment in the second judging part judging whether by a macro-photographing or right side spot light deviation, the measurement of the third distance information $l_R$ is stopped and the operation by only the projected light spots C and L is made. Therefore, in the flow in FIG. 6, the same routine as in the above mentioned FIG. 4 shall bear the same step number and shall not be explained here but only the different routines shall be explained.

In FIG. 6, the step S3a is the same in the contents as the step S3 in the above mentioned FIG. 4 but is different in the direction of the unequal sign. The flow on the right side in FIG. 6, that is, of the steps S5, S4, S21 and S22 becomes the third judging part and the central flow, that is, of the step S12 becomes the first judging part. On the other hand, the light side flow, that is, of the steps S9 to S11 becomes the second judging part the same as the flow in the above mentioned FIG. 4.

In the step S2, if the first distance information $l_C$ is smaller than the near distance comparing value $l_N$, that is, is in a distance nearer than the near distance comparing value $l_N$ to the far distance comparing value $l_F$, that is, than the predetermined distance range of $l_N$ to $l_F$, the steps S9, S10 and S11 will be carried out at once without passing through the steps S7 and S8 in the above mentioned FIG. 4, because, even if the first distance information $l_C$ is a distance nearer than the predetermined range of $l_N$ to $l_F$ because of the spot light deviation, as this spot light deviation is a right side spot light deviation mis-measuring the distance toward the extremely near side as explained in the above mentioned FIGS. 10A and 10B, there will be no need of projecting the light from the IRED $3_R$ (See FIG. 1) in the third light projecting means projecting the light to the further right side than the projected light spot C by the first light projecting means.

In the step S3a, in case the first distance information $l_C$ exceeds the far distance comparing value $l_F$, the flow will proceed to the third judging part and the steps S5 and S4 will be carried out. The step S6 in FIG. 4 is divided into two routines S21 and S22 in this FIG. 6. By the way, the first judging part is exactly the same as in FIG. 4. According to the modification shown in FIG. 6, in the second judging part judging whether by a right side spot light deviation or a macro-photographing, the distance is not measured by the projected light spot R and therefore the time lag of the macro-photographing can be suppressed.

Figures 7, 8:
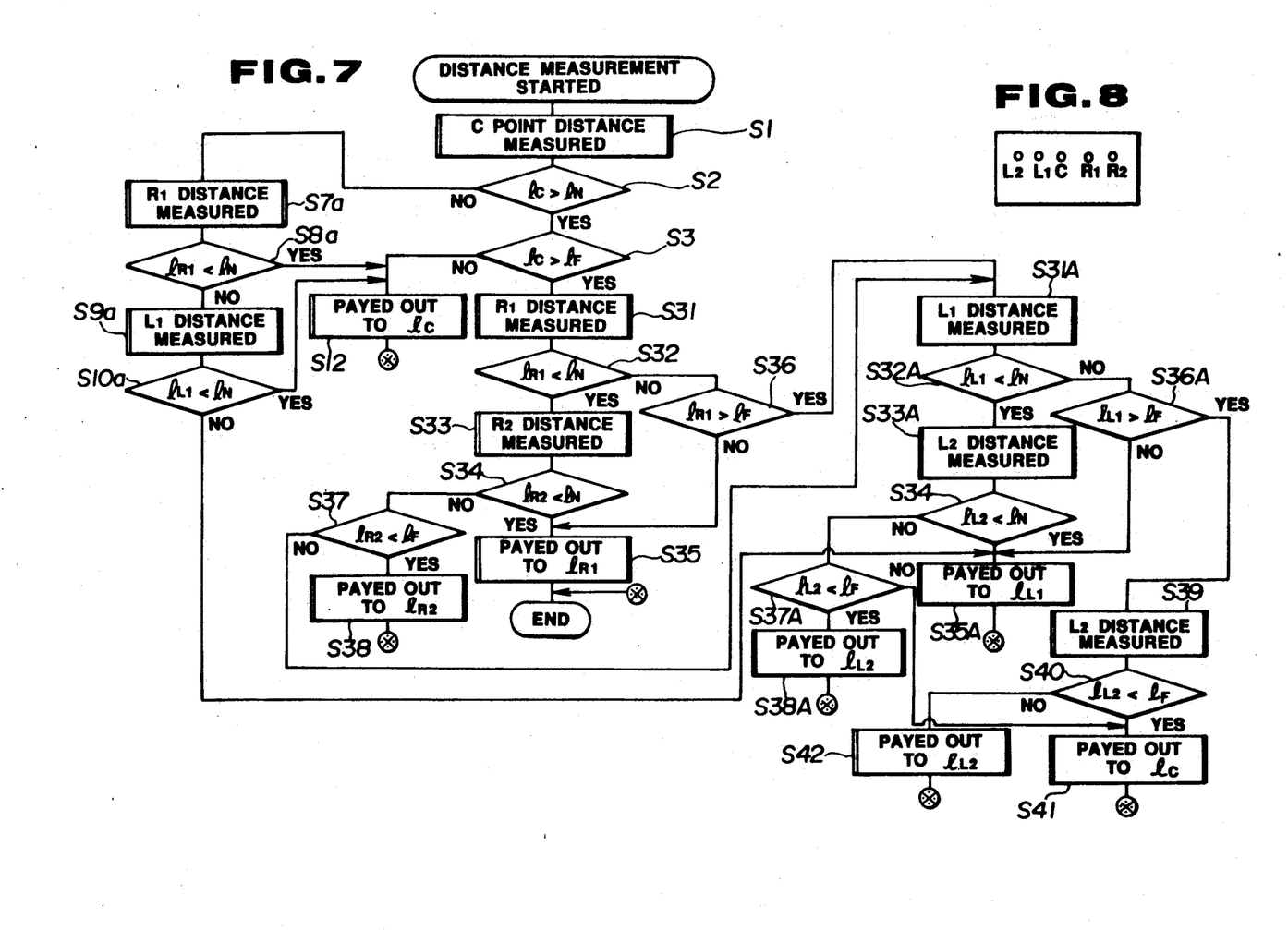
FIG. 7 is a flow chart showing the operation of a distance measuring apparatus provided additionally with a third light projecting means.
FIG. 8 is an arrangement view of projected light spots in the distance measuring apparatus in the above mentioned FIG. 7.

Now, FIG. 7 shows a flow chart for determining a lens pay-out distance of a CPU in a distance measuring apparatus in which an IRED is additionally provided and the fourth and fifth light projecting means $L_2$ and $R_2$ are provided outside the first light projecting means C and the second and third light projecting means $L_1$ and $R_1$. In this case, the projected light spots on the object to be photographed are formed as in FIG. 8.

In the flow shown in the above mentioned FIG. 7, the first judging part consisting of the step S12 is the same as in the above mentioned FIGS. 4 and 6. Also, the second judging part consisting of the steps S7a to S10a will be exactly the same as of the flow diagram in the above mentioned FIGS. 4 and 6 if the projected light spots L and R on the object of the distance measuring light by the second and third light projecting means are replaced with $L_1$ abd $R_1$. Therefore, the first and second judging parts shall not be explained here. The third judging part of step numbers and after S31 shall be explained in the following.

By the way, in the flow in this FIG. 7, when the third and fifth distance informations by the adjacent projected light spots, for example, $R_1$ and $R_2$ shown in FIG.

8 are nearer than the near distance comparing value $l_N$, not a spot light deviation but a macro-photographing will be considered and the third distance information $l_{R1}$ by the projected light spot $R_1$ near to the central projected light spot C will be selected.

In this flow, when the first distance information $l_C$ by the central projected light spot C from the first light projecting means is larger than the near distance comparing value $l_N$ (steps S1 and S2), this state will be considered to be not only of the case that the distance is normally measured but also of the case that the projected light spot C is centrally blank or the left side spot light at the time of macro-photographing deviates (See FIGS. 11A and 11B). Therefore, the flow proceeds to the step S3 and the first distance information $l_C$ is compared with the far distance comparing value $l_F$. If it is larger than the comparing value $l_F$, it will be of a central blank or a left side spot light deviation. Therefore, the flow proceeds to the third judging part in and after the step S31. Then, in this third judging part, the second and third distance informations $L_{L1}$ and $l_{R1}$ are considered to be the first distance information and the second and third distance informations $l_{L2}$ and $L_{R2}$ are considered to be the second distance information to determine the photographing distance.

That is to say, first of all, the distance of the right side projected light spot $R_1$ is measured from the third light projecting means (step S31) and the right side third distance information $l_{R1}$ obtained as a result is compared with the near distance comparing value $l_N$ (step S32). If the right side third distance information $l_{R1}$ is smaller, that is, nearer to the extremely near distance than the near distance comparing value $l_N$, the right side projected light spot $R_1$ from the third light projecting means will be of the right side light spot deviation (See FIGS. 10A and 10B) or the macro-photographing, therefore the distance of the right side projected light spot $R_2$ from the fifth light projecting means is measured (step S33) and the right side fifth distance information $l_{R2}$ obtained as a result is compared with the near distance comparing value $l_N$ (step S34). If the right side fifth distance information $l_{R2}$ is smaller than the near distance comparing value $l_N$, the right side third distance information $l_{R1}$ will be also smaller than the near distance comparing value $l_N$ (the above mentioned step S32), therefore it is judged to be of the macro-photographing by the projected light spots $R_1$ and $R_2$, the photographing lens is payed out to the position of the third distance information $l_{R1}$ by the projected light spot $R_1$ near the central projected light spot C and this flow ends.

Returning to the above mentioned step S34, if the right side fifth distance information $l_{R2}$ is larger than the near distance comparing value $l_N$, in this state, the projected light spot $R_1$ will be of the right side spot light deviation or the projected light spot $R_2$ will be normal, of the left side spot light deviation or of the central hollow, therefore the flow proceeds to the step S37 and the right side fifth distance information $l_{R2}$ is compared with the far distance comparing value $l_F$. If the comparing value $l_F$ is not exceeded, the projected light spot $R_1$ will be of the right side spot light deviation or the projected light spot $R_2$ will be of the central hollow or the left side spot light deviation. Therefore, the flow proceeds to the step S38, the lens is payed out to the position of the right side fifth distance information $l_{R2}$ and this flow ends. On the other hand, if the right side fifth distance information $l_{R2}$ is larger than the far distance comparing value $l_F$, the projected light spot $R_1$ will be of the right side spot light deviation or the projected light spot $R_2$ will be normal and therefore the flow proceeds to the later described step S37.

Returning to the above mentioned step S32, if the right side third distance information $l_{R1}$ is larger than the near distance comparing value $l_N$, the projected light spot $R_1$ will be normal or of the left side spot light deviation or the central blank. Therefore, the above mentioned right side third distance information $l_{R1}$ is compared with the far distance comparing value $l_F$ (step S36), if it is smaller than the comparing value $l_F$, the projected light spot $R_1$ will be normal and therefore the flow proceeds to the above mentioned step S23 but, if it is larger than the comparing value $l_F$, the projected light spot $R_1$ will be of the left side spot light deviation or the central blank and therefore the flow proceeds to the "$L_1$ distance measurement" in the step S31A. These steps S31A to S38A have only the projected light spots $R_1$ and $R_2$ in the above mentioned steps S31 to S38 replaced with projected light spots $L_1$ and $L_2$. Therefore the same step numbers shall bear the letter A after them and shall not be explained.

In the step S36A, if the left side second distance information $l_{L1}$ is larger than the far distance comparing value $l_F$, the projected light spot $L_1$ will be of the left side spot light deviation or the central blank, therefore the "$L_2$ distance measurement" is made (step S39) and the left side fourth distance information $l_{L2}$ obtained as a result is compared with the far distance comparing value $l_F$ (step S40). If the left side fourth distance information $l_{L2}$ is larger than the far distance comparing value $l_F$, the lens will be driven to the position determined by the first distance information $l_C$ but, if it is smaller than the far distance comparing value $l_F$, the lens will be driven to the position determined by the left side fourth distance information $l_{L2}$ and this flow ends.

Thus, if so formed as to perform the operations shown in the flow in the above mentioned FIG. 7, as five distance measuring lights are projected toward the object by using five IRED's, the spot light deviation and central blank will be substantially perfectly prevented and thereby the distance measuring precision will be able to be further improved.

By the way, in the above mentioned embodiment, the light projecting means and the light receiving means are so arranged that the light projecting means may be on the left side for the photographed picture but may be arranged on the right side. However, in this case, the spot light will deviate reversely and therefore the R point and L point may be reversed relative to each other.

What is claimed is:

1. A camera distance measuring apparatus wherein a light projecting means and a light receiving means are arranged in the lengthwise direction of a camera to detect the position of the reflected light from an object to be photographed of a light projected by the light projecting means, comprising:

a light projecting means provided with:
   a first light projecting means for projecting a light toward the vicinity of the center of a picture to be photographed,
   a second light projecting means for projecting a light toward the light projecting means side from said vicinity of the center of the picture to be photographed and a third light projecting means for projecting a light toward the light receiving means side from said vicinity of the center of the picture to be photographed;

a first distance detecting means for detecting by said light receiving means the light receiving position of the reflected light from the object of a beam projected by said first light projecting means and detecting a first distance from this light receiving position to the object;

a second distance detecting means for detecting by said light receiving means the light receiving position of the reflected light from the object of a beam projected by said second light projecting means and detecting a second distance from this light receiving position to the object;

a third distance detecting means for detecting by said light receiving means the light receiving position of the reflected light from the object of a beam projected by said third light projecting means and detecting a third distance from this light receiving position to the object; and a distance determining means for determining photographing distance by using said first, second and third distances; said distance determining means having the following judging means:

a first judging means whereby it is judged whether said first distance is within a predetermined range or not and, in case it is within this predetermined range, said first distance will be determined to be a photographing distance, a second judging means whereby, in case said first distance is in a distance nearer than the predetermined range, unless said second distance is a distance nearer than said predetermined range, said second distance will be determined to be a photographing distance and, in case said second distance is a distance nearer than the predetermined range, the first distance will be determined to be a photographing distance and a third judging means whereby, in case said first distance is in a distance farther than said predetermined range, said second distance or said third distance will be determined to be a photographing distance.

2. A camera distance measuring apparatus according to claim 1 characterized in that said second judging means will determine said second distance to be a photographing distance only in case said second distance is not a distance nearer than said predetermined range and in case said third distance is not also a distance nearer than said predetermined range.

3. A camera distance measuring apparatus according to claim 1 characterized in that said third judging means selects the nearest distance of said second distance and third distance and determines it as a photographing distance.

4. A camera distance measuring apparatus according to claim 1 characterized by comprising fourth and fifth light projecting means for projecting lights further outside the distance measuring optical axes of said second and third light projecting means and fourth and fifth distance detecting means for detecting the light receiving positions of the reflected lights from the object of beams projected by the fourth and fifth light projecting means and detecting the fourth and fifth distances from the light receiving positions to the object to be photographed so that, in case it is judged by said third judging means that said first distance is farther than said predetermined range, said second distance will be replaced with the first distance, said fourth or fifth distance will be replaced with the second distance and a judgment will be made by said first judging means and second judging means.

5. A camera distance measuring apparatus comprising:

a first light projecting means for projecting a light toward the vicinity of the center of a picture to be photographed;

a first distance detecting means for detecting by said light receiving means the light receiving position of the reflected light from the object of a beam projected by said first light projecting means and detecting the first distance from said light receiving position to the object.

a first comparing means for comparing whether said first distance is in a predetermined distance range;

a first photographing distance determining means for determining said first distance to be a photographing distance in case said first distance is in the predetermined distance range as a result of the comparison of said first comparing means;

a second light projecting means for projecting a light at least toward the direction on said first light projecting means side from the center of said picture to be photographed in case said first distance is in a distance nearer than said predetermined distance range as a result of the comparison of said first comparing means;

a second distance detecting means for detecting by said light receiving means the light receiving position of the reflected light from the object of a beam projected by said second light projecting means and detecting the second distance from said light receiving position to the object;

a second comparing means for comparing said second distance and a first predetermined distance on the near distance side of said predetermined distance range with each other; and a second photographing distance determining means for determining said first distance to be a photographing distance in case said second distance is nearer than said first predetermined distance as a result of the comparison of said second comparing means and determining said second distance to be a photographing distance in case said second distance is farther than said first predetermined distance.

6. A camera distance measuring apparatus according to claim 5 wherein said first photographing distance determining means is further provided with a third comparing means for comparing said first distance and the second predetermined distance on said predetermined distance range side with each other so that, as a result of the comparison of said third comparing means, in case said first distance is farther than said second predetermined distance, a photographing distance may be determined by using said second distance.

7. A camera distance measuring apparatus according to claim 6 further comprising:

a third light projecting means for projecting a light toward the direction reverse to said first light projecting means side from the center of said picture to be photographed in case said first distance is in a distance nearer than said predetermined distance range as a result of the comparison of said first comparing means; and a third distance detecting means for detecting the light receiving position of the reflected light from the object of a beam projected by said third light projecting means and detecting the third distance from said light receiving position to the object;

so that, as a result of the comparison of said third comparing means, in case said first distance is farther than said second predetermined distance, the nearer side of said second distance and third distance will be determined to be a photographing distance.

8. A camera distance measuring apparatus comprising:

a first light projecting means for projecting a distance measuring light to an object in the central part of a picture;

a second light projecting means for projecting a distance measuring light to an object in a peripheral part adjacent in the horizontal direction on the picture to said central part;

a distance measuring operating means for receiving the reflected lights from the objects of said first light projecting means and second light projecting means and outputting respectively the first and second distance informations in response to the object distances; and a photographing distance determining means for determining the photographing distance on the basis of said first and second distance informations wherein:

in case said first distance information is of a value corresponding to a predetermined distance range or in case both of said first distance information and second distance information are of a value corresponding to a distance nearer than said predetermined distance range, the photographing distance will be determined on the basis of said first distance information, and in case said first distance information is of a value corresponding to a distance farther than said predetermined distance range or in case said first distance information is of a value corresponding to a distance nearer than said predetermined distance range and said second distance information is not of a value correspoding to a distance nearer than said predetermined distance range, the photographing distance will be determined on the basis of said second distance information.

9. A camera distance measuring apparatus according to claim 8 wherein said second light projecting means will project said distance measuring light in case it is judged by said photographing distance determining means that said first distance information is not of a value corresponding to said predetermined distance range.

10. A camera distance measuring apparatus for measuring the distances of a plurality of objects to be photographed within a picture, comprising;

a light projecting means for projecting distance measuring light to a first point within the picture and an object to be photographed in a peripheral part adjacent in the horizontal direction on the picture to said first point;

a distance operating means for receiving the reflected light from said plurality of objects and outputting distance informations in response to the object distances; and a photographing distance determining means for determining the photograhing distance on the basis of the distance information of said first point in case it is judged from the output of said distance operating means that the object of said first point is in the predetermined distance range or that both of the first point and the object the peripheral part are in a distance nearer than said distance range and determining the photographing distance on the basis of the distance information of said peripheral part in case it is judged that the object of said first point is a distance farther than said predetermined distance range or that the object of the first point is a distance nearer than said distance range but the object of the peripheral part is not a distance nearer than said distance range.

11. A camera distance measuring apparatus according to claim 10 wherein said first point is substantially in the central part of the picture to be photographed.

12. A camera distance measuring apparatus according to claim 10 wherein said first point is a center point of at least three distance measuring points arranged adjacently in the horizontal direction of the picture.

13. A distance measuring apparatus in a camera having a light projecting means and a light receiving means, said light projecting means and said light receiving means being arranged in a predetermined direction of the camera to detect a position of an object by light reflected from the object to be photographed due to a light projected by said light projecting means, comprising:

a distance detecting means for detecting object distances from respective light receiving positions of the reflected light from objects to be photographed of respective lights projected by said light projecting means in a plurality of directions including the vicinity of a center of a scene to be photographed; and a photographing distance determining means for determining a second distance to be a photographing distance when a first distance near the center of said scene to be photographed is nearer than a predetermined distance and the second distance detected by the reflected light of the light projected toward a side of the scene is farther than said predetermined distance.

14. A camera distance measuring apparatus comprising:

a first light projecting means for projecting a distance measuring light to a central part of a scene to be photographed;

a first distance measuring operating means outputting a first distance information in response to a light receiving state of a light reflected from said central part of the scene;

a judging means for comparing said first distance information with at least one predetermined value for judging from said first distance information whether the distance measuring light of said first light projecting means is being normally projected or not;

a second light projecting means for projecting a distance measuring light to a peripheral part of the scene responsive to a judging means result that a distance measuring light of said first light projecting means is not normally projected;

second distance measuring operating means outputting a second distance information in response to a light receiving state of a light reflected from said peripheral part of the scene;

a photographing distance determining means for determining a photographing distance from said first distance information when it is judged by said judging means that the distance measuring light of said first light projecting means is being normally projected to the main object and for determining a photographing distance from said second distance information when it is judged that the distance measuring light of said first light projecting means is not being normally projected.

15. A camera distance measuring apparatus according to claim 14 wherein:

said judging means includes means for judging that said distance measuring light is being normally projected to the main object when said first distance measuring information is of a value corresponding to a predetermined distance range or when both said first distance information and said second distance information are of a value corresponding to a distance nearer than said predetermined distance range and means for judging that said distance measuring light is not being normally projected to the main object when said first distance information is of a value corresponding to a distance farther than said predetermined distance range or when said first distance information is nearer than said distance range and said second distance information is not nearer than said distance range.

16. A camera distance measuring apparatus according to claim 14 wherein said judging means further comprises means for comparing said second distance information with at least one predetermined value.

17. A camera distance measuring apparatus according to claim 14 wherein said first light projecting means includes means to generate a spot-like beam and said distance detecting means comprises means for determining when said beam only partially impinges upon a center object to indicate that light is not being normally projected.

18. A photographing distance determining method of projecting distance measuring light to a plurality of objects to be photographed including at least a central part of a scene, receiving the reflected light from said plurality of objects and determining a photographing distance on the basis of distance informations corresponding to the object distances, comprising the steps of:

(a) projecting a distance measuring light to an object in the central part of the scene and receiving a reflected light to determine a distance information;

(b) judging whether the distance information of said central part object is in a predetermined photographing distance range or not;

(c) determining a photographing distance from the distance information of said central part object when it is judged by step (b) that the central part object is in the predetermined photographing distance range;

(d) projecting a distance measuring light to an object of a part adjacent to the central part and receiving a reflected light to determine a distance information when it is judged by step (b) that the distance information of the central part object is out of the photographing distance range;

(e) judging from the respective distance information of the adjacent part and said central part whether said central part object is in an extremely near photographing range or not;

(f) determining a photographing distance from the distance information of said central part object in when it is judged by step (e) that the central part object is in the extremely near photographing range; and (g) determining a photographing distance from the distance information of said adjacent part when it is judged by step (e) that the central part object is not in the extremely near photographing range.

19. A photographing distance determining method in a camera distance measuring apparatus comprising the steps of:

providing a first light projecting means and projecting a light therefrom toward the vicinity of the center of a scene to be photographed; providing a second light projecting means and projecting a light therefrom toward the direction on a side of the scene to be photographed; providing a first distance detecting means for detecting a light receiving position of a light reflected by an object due to a beam projected by said first light projecting means and detecting a first distance from this light receiving position to the object; providing a second distance detecting means for detecting a light receiving position of a light reflected by an object due to a beam projected by said second light projecting means and detecting a second distance from this light receiving position to the object:

comparing said first distance with a predetermined distance, comparing said second distance with said predetermined distance and determining the second distance to be the photographing distance when said first distance is nearer than said predetermined distance and said second distance is farther than said predetermined distance.

* * * * *

UNITED STATES PATENT AND TRADEMARK OFFICE
CERTIFICATE OF CORRECTION

PATENT NO.   : 5,264,892
DATED        : November 23, 1993
INVENTOR(S)  : Nonaka et al.

It is certified that error appears in the above-indentified patent and that said Letters Patent is hereby corrected as shown below:

On the Title Page in the list of Inventors, change
    "Yamuchi" to --Yamauchi--
Column 2, line 4, after "distance" insert --1--
Column 2, line 50, change "splot" to --spot--
Column 3, line 42, after "views" delete "for" (first occurrence)
Column 3, line 66, change "relationship" to --relationships--
Column 7, line 49, change "$L_R$" to --$l_R$--
Column 8, line 62, change "abd" to --and--
Column 9, line 21, change "$L_{L1}$ and $l_{R1}$" to --$l_{L1}$ and $l_{R1}$--
Column 9, line 23, change "$l_{L2}$ and $L_{R2}$" to --$l_{L2}$ and $l_{R2}$--
Column 11, line 33, delete "in a distance"
Column 11, line 42, delete "in a distance"
Column 12, line 1, after "is" insert --in a distance--
Column 13, line 48, change "correspoding" to --corresponding--
Column 14, line 4, change "photograhing" to --photographing--
Column 14, line 9, after "object" insert --in--
Column 14, line 9, after "are" delete "in"

Signed and Sealed this

Twenty-third Day of August, 1994

Attest:

BRUCE LEHMAN

Attesting Officer

Commissioner of Patents and Trademarks